(12) United States Patent
Balakrishnan et al.

(10) Patent No.: US 10,176,142 B2
(45) Date of Patent: Jan. 8, 2019

(54) TECHNIQUES OF ACCESSING BMC TERMINALS THROUGH SERIAL PORT

(71) Applicant: American Megatrends, Inc., Norcross, GA (US)

(72) Inventors: Venkatesan Balakrishnan, Chennai (IN); Varadachari Sudan Ayanam, Suwanee, GA (US); Senguttuvan Marimuthu, Chennai (IN); Maheswari Alagarsamy, Madurai (IN)

(73) Assignee: AMERICAN MEGATRTENDS, INC., Norcross, GA (US)

( * ) Notice: Subject to any disclaimer, the term of this patent is extended or adjusted under 35 U.S.C. 154(b) by 237 days.

(21) Appl. No.: 15/241,218

(22) Filed: Aug. 19, 2016

(65) Prior Publication Data

US 2018/0052798 A1    Feb. 22, 2018

(51) Int. Cl.
*G06F 9/00* (2006.01)
*G06F 15/177* (2006.01)
*G06F 13/42* (2006.01)
*G06F 11/36* (2006.01)
G06F 9/4401 (2018.01)

(52) U.S. Cl.
CPC .......... *G06F 13/4282* (2013.01); *G06F 11/36* (2013.01); *G06F 9/4401* (2013.01)

(58) Field of Classification Search
CPC ...................................................... G06F 19/44
See application file for complete search history.

(56) References Cited

U.S. PATENT DOCUMENTS

| | | | | |
|---|---|---|---|---|
| 8,868,790 | B2 * | 10/2014 | Lovett | H04L 49/10 370/463 |
| 2006/0209680 | A1 * | 9/2006 | Lee | H04L 12/5692 370/217 |
| 2012/0159035 | A1 * | 6/2012 | Yin | G06F 13/385 710/316 |
| 2013/0117766 | A1 * | 5/2013 | Bax | G06F 9/4405 719/323 |
| 2013/0326278 | A1 * | 12/2013 | Yin | G06F 11/362 714/38.1 |
| 2016/0261455 | A1 * | 9/2016 | Su | H04L 41/069 |
| 2017/0024303 | A1 * | 1/2017 | Christopher | G06F 11/366 |
| 2017/0097880 | A1 * | 4/2017 | Yeh | G06F 11/3003 |

* cited by examiner

*Primary Examiner* — Mohammed H Rehman
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be an embedded-system device. The embedded-system device obtains, through a first serial port, first input from a source and directed to a serial port. The embedded-system device attempts to detect in the first input a request for accessing the embedded-system device. The embedded-system device processes second input from the source received through the first serial port when the request is detected in the first input.

17 Claims, 4 Drawing Sheets

TECHNIQUES OF ACCESSING BMC TERMINALS THROUGH SERIAL PORT

BACKGROUND

Field

The present disclosure relates generally to embedded-system devices, and more particularly, to techniques of providing access to terminals on a baseboard management controller (BMC) through a serial port of the BMC.

Background

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

The BMC may be considered as an embedded-system device. In certain circumstances, BMC debug terminals are not populated in production servers. Further, it may be difficult to obtain access to the system and the debug header of a BMC in the working environment. Therefore, there is a need to provide access to BMC terminals on a production server.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an embedded-system device. The embedded-system device obtains, through a first serial port, first input from a source and directed to a serial port. The embedded-system device attempts to detect in the first input a request for accessing the embedded-system device. The embedded-system device processes second input from the source received through the first serial port when the request is detected in the first input.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
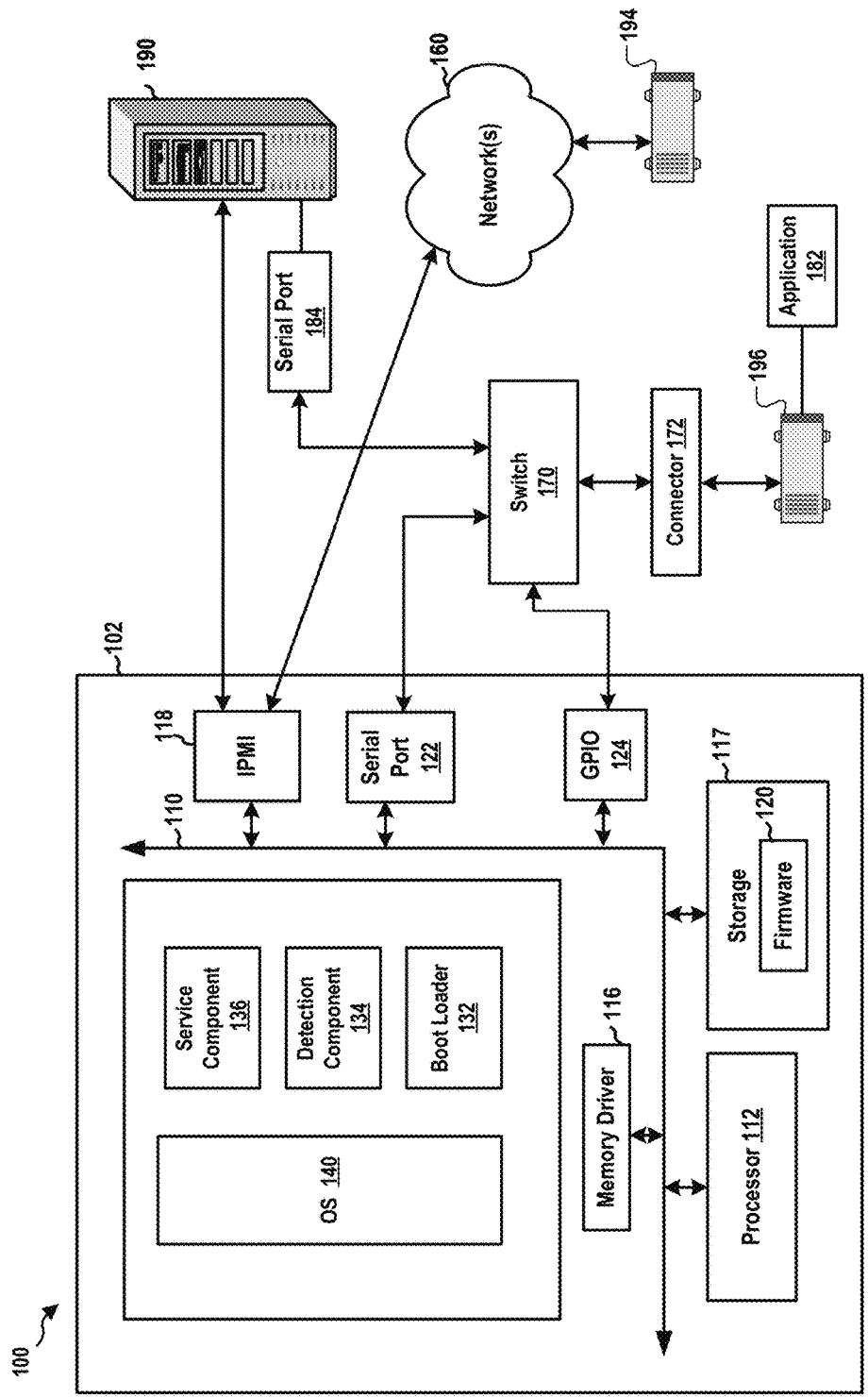
FIG. 1 is a diagram illustrating an embedded-system device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In certain circumstances, BMC debug terminals are not populated in production servers. Further, it may be difficult to obtain access to the system and the debug header of a BMC in the working environment. Therefore, it may be useful to provide access to the debug terminal on a production server.

The techniques described infra may provide access to the BMC debug terminal (or console) or other terminals when there is no physical access to the BMC header. The BMC may first boot to a boot loader (e.g., UBOOT) and may wait for a predetermined time period (e.g., 3, 5, or 10 seconds) for user input and then loads the BMC firmware. In the waiting time period, the boot loader switches a switch (or a serial multiplexer) to direct commands and/or data, received from a device, to a serial port of the BMC instead of to a serial port of a host of the BMC. The boot loader then looks for a signature from input at the serial port of the BMC.

If the signature is received at the serial port, the boot loader set the output terminal to the serial port. Now a device can get the terminal and can perform debug and recovery operations as needed through the serial port. In certain configurations, the device can instruct the BMC to boot to an operating system (OS, e.g., LINUX) of the BMC and then can perform the debug and recovery operations on the OS.

In certain configurations, the host may function as the device and may obtain access to the terminals of the BMC through the serial port of the BMC. The host connection can be automated to connect to the terminal of the BMC using a chat script or a custom program. The chat script may open the serial port on the host, and then may write the signature and expect a response. If the response is received, the chat script may start the terminal. In certain circumstances, a user may start the chat script or the custom application on the host, and then may reboot the BMC. As such, the host may obtain access to the BMC terminal. In case of firmware failure condition, the boot loader is intact, and the BMC may keep restarting due to a watchdog. The chat script or the custom application can stop the BMC at the boot loader. The user on the host can connect to the terminal and perform debug or recovery operations.

FIG. 1 is a diagram 100 illustrating an embedded-system device. In this example, the embedded-system device is a BMC 102. The BMC 102 has a processor 112, a memory 114, a memory driver 116, a serial port 122, a general-purpose input/output (GPIO) port 124, and a storage 117. Further, the BMC 102 may support IPMI and may have an IPMI interface 118. The memory 114, the processor 112, the memory driver 116, the storage 117, the serial port 122, the GPIO port 124, and the IPMI interface 118 may be in communication with each other through a communication channel 110 such as a bus architecture.

The BMC 102 may be in communication with, through the IPMI interface 118, a host computer 190 and/or a network device 194. The IPMI communication between the BMC and the network device 194 may be carried over a network 160. The BMC may manage the host computer 190. The host computer 190 has a serial port 184.

Further, a switch 170 switches communication with a connector 172 to one of the serial port 122 of the BMC 102 and the serial port 184 of the host computer 190. In other words, the switch 170 may operate in two states. In one of the two states, the switch 170 allows communication between the serial port 122 and the connector 172 but disallows communication between the serial port 184 and the connector 172. In the other one of the two states, the switch 170 allows communication between the serial port 184 and the connector 172 but disallows communication between the serial port 122 and the connector 172. Further, the BMC 102 may be in communication with the switch 170 through the GPIO port 124. The BMC 102 may instruct the switch 170 to switch between the two states through the GPIO port 124. Further, a computing device 196 (or the host computer 190) may be connected to the connector 172 and may, thus, communicate with the BMC 102 through the serial port 122 or with the host computer 190 through the serial port 184 depending on the state of the switch 170.

The storage 117 of the BMC 102 may store BMC firmware 120. When the processor 112 executes the BMC firmware 120, the processor 112 loads code and data of the BMC firmware 120 into the memory 114. In this example, the BMC firmware 120 initially provides in the memory 114, among other components, a boot loader 132 for execution. In certain configurations, after being loaded, the boot loader 132 may instruct the switch 170 to connect the serial port 122 with the connector 172, e.g., through the GPIO port 124. The switch 170 accordingly allows communication between the connector 172 and the serial port 122 and disallows communication between the connector 172 and the serial port 184. As such, the computing device 196 may send commands and/or data to the serial port 122.

After instructing the switch 170 to connect the connector 172 with the serial port 122, the boot loader 132 may utilize a detection component 134 to listen to the input at the serial port 122 for a predetermined time period (e.g., 3, 5, or 10 seconds) and to detect whether the input received at the serial port 122 contains a particular indication. For example, the particular indication may be a signature such as a specific sequence of data.

On the other hand, when the computing device 196 wants to communicate with the BMC 102, at the time of the booting of the BMC 102, the computing device 196 may repeatedly send the particular indication to the connector 172. After the BMC 102 instructs the switch 170 to direct input from the connector 172 to the serial port 122, the detection component 134 of the BMC 102 may detect the particular indication from the input received at the serial port 122.

When the detection component 134 detects the particular indication at the serial port 122 in the predetermined time period, the boot loader 132 can determine that the computing device 196 wants to communicate with the BMC 102 through the serial port 122. The boot loader 132 may launch a service component 136 that can process the commands and/or data received from the computing device 196 through the serial port 122. The boot loader 132 may also send a response back to the computing device 196 through the serial port 122, indicating that the BMC 102 is ready for communicating with the computing device 196. Accordingly, the computing device 196 may use a serial port communication application 182 to communicate with the service component 136 through the serial port 122. For example, the serial port communication application 182 may be a PuTTY application and the service component 136 may support a debugging program. Therefore, the computing device 196 may perform a debugging operation on the BMC 102. Once the debugging process is completed, the serial port communication application 182 may send an indication to the service component 136. The service component 136 may return the control back to the boot loader 132. Accordingly, the boot loader 132 may instruct the switch 170 to connect the connector 172 with the serial port 184. The boot loader 132 then may boot an OS 140 of the BMC 102.

When the detection component 134 does not detect the particular indication at the serial port 122 in the predetermined time period, the boot loader 132 can determine that the computing device 196 does not want to communicate with the BMC 102 through the serial port 122. Accordingly, the boot loader 132 may instruct the switch 170 to connect the connector 172 with the serial port 184. The boot loader 132 then boots the OS 140.

Figure 2:
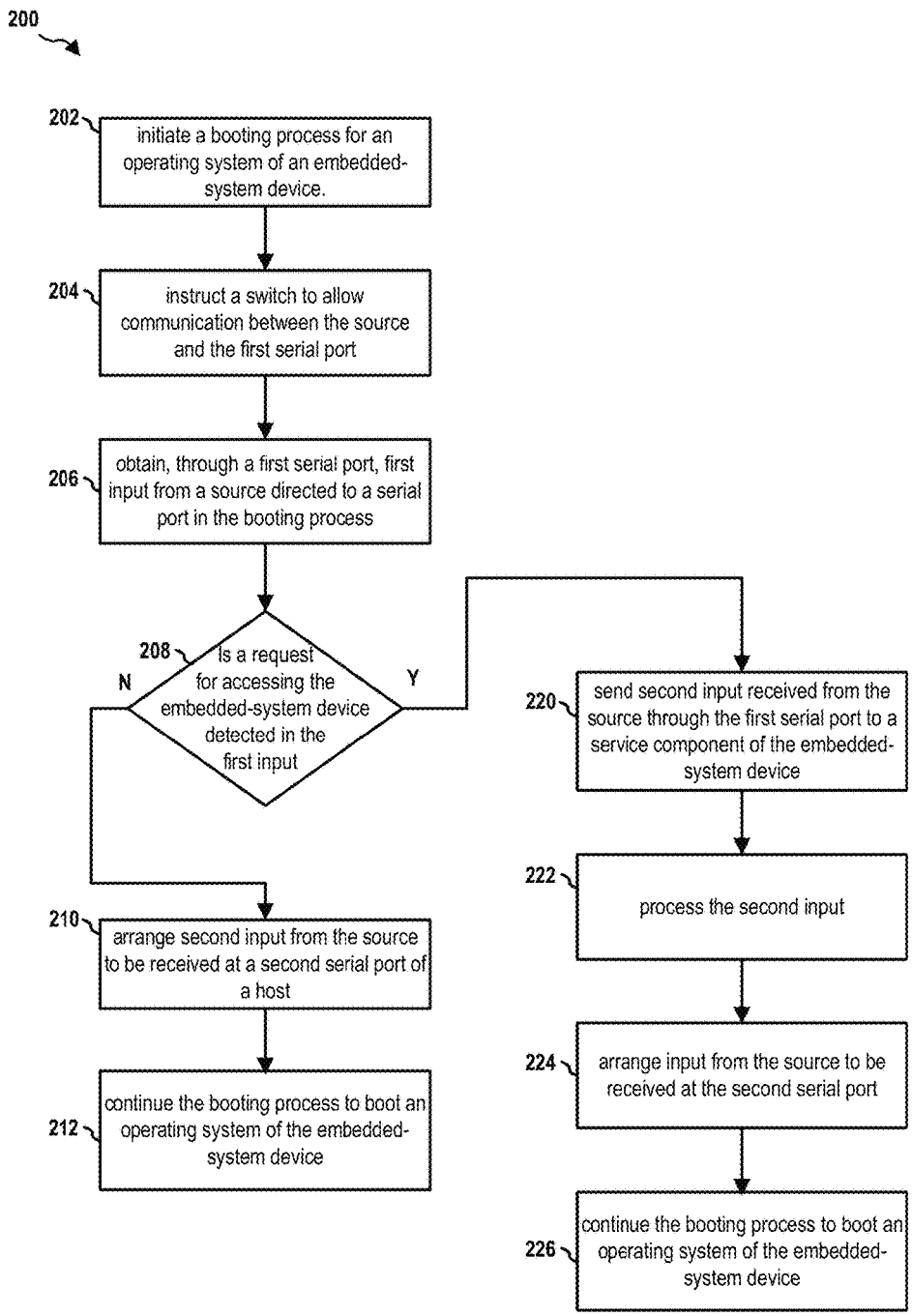
FIG. 2 is a flow chart of a method (process) for providing access to a serial port.

FIG. 2 is a flow chart 200 of a method (process) for providing access to a serial port. The method may be performed by an embedded-system device (e.g., the BMC 102 and the apparatus 102'). At operation 202, the embedded-system device (e.g., utilizing the boot loader 132) initiates a booting process for an operating system (e.g., the OS 140) of the embedded-system device. At operation 204, the embedded-system device instructs a switch (e.g., the switch 170) to allow communication between a source (e.g., the connector 172) and a first serial port (e.g., the serial port 122) of the embedded-system device. The switch directs communication with the source to one of the first serial port and a second serial port (e.g., the serial port component 144) of a host (e.g., the host computer 190). At operation 206, the embedded-system device obtains, through the first serial port, first input from the source and directed to a serial port.

At operation 208, the embedded-system device (e.g., utilizing the detection component 134) determines whether a request for accessing the embedded-system device is detected in the first input. When the request is not detected, at operation 210, the embedded-system device arranges second input from the source to be received at the second serial port of the host. At operation 212, the embedded-system device continues the booting process to boot the operating system of the embedded-system device.

When the request is detected in the first input, at operation 220, the embedded-system device sends the second input to a service component (e.g., the service component 136) of the embedded-system device. The second input contains command or data that are recognizable by the service component. At operation 222, the embedded-system device (e.g., utilizing the service component 136) processes the second input from the source received through the first serial port. At operation 224, the embedded-system device arranges input from the source to be received at the second serial port. At operation 226, the embedded-system device continues the booting process to boot the operating system of the embedded-system device.

Figure 3:
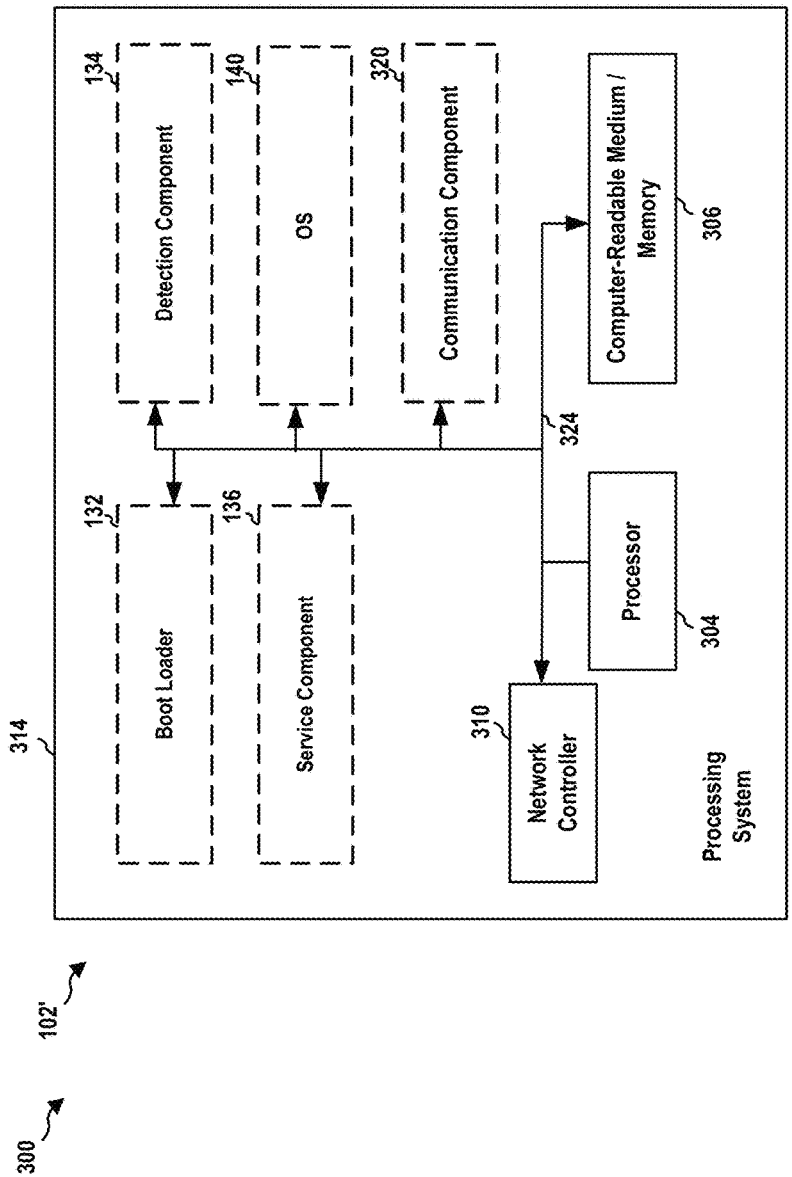
FIG. 3 is a diagram illustrating an example of a hardware implementation for an apparatus employing a processing system.

FIG. 3 is a diagram 300 illustrating an example of a hardware implementation for an apparatus 102' employing a processing system 314. The processing system 314 may be implemented with a bus architecture, represented generally by the bus 324. The bus 324 may include any number of interconnecting buses and bridges depending on the specific application of the processing system 314 and the overall design constraints. The bus 324 links together various circuits including one or more processors and/or hardware components, represented by the processor 304, the boot loader 132, the detection component 134, the service component 136, the OS 140, and the computer-readable medium/memory 306. In particular, the computer-readable medium/memory 306 may include the memory 114 and the storage 117. The bus 324 may also link various other circuits such as timing sources, peripherals, voltage regulators, and power management circuits, which are well known in the art, and therefore, will not be described any further.

The processing system 314 may be coupled to a network controller 310. The network controller 310 provides a means for communicating with various other apparatus over a network. The network controller 310 receives a signal from the network, extracts information from the received signal, and provides the extracted information to the processing system 314, specifically a communication component 320 of the apparatus 102'. In addition, the network controller 310 receives information from the processing system 314, specifically the communication component 320, and based on the received information, generates a signal to be sent to the network. The processing system 314 includes a processor 304 coupled to a computer-readable medium/memory 306. The processor 304 is responsible for general processing, including the execution of software stored on the computer-readable medium/memory 306. The software, when executed by the processor 304, causes the processing system 314 to perform the various functions described supra for any particular apparatus. The computer-readable medium/memory 306 may also be used for storing data that is manipulated by the processor 304 when executing software. The processing system further includes at least one of the boot loader 132, the detection component 134, the service component 136, the OS 140. The components may be software components running in the processor 304, resident/stored in the computer readable medium/memory 306, one or more hardware components coupled to the processor 304, or some combination thereof.

The apparatus 102' may be configured to include means for performing each of the operations described supra referring to FIG. 2. The aforementioned means may be one or more of the aforementioned components of the apparatus 102 and/or the processing system 314 of the apparatus 102' configured to perform the functions recited by the aforementioned means.

Figure 4:
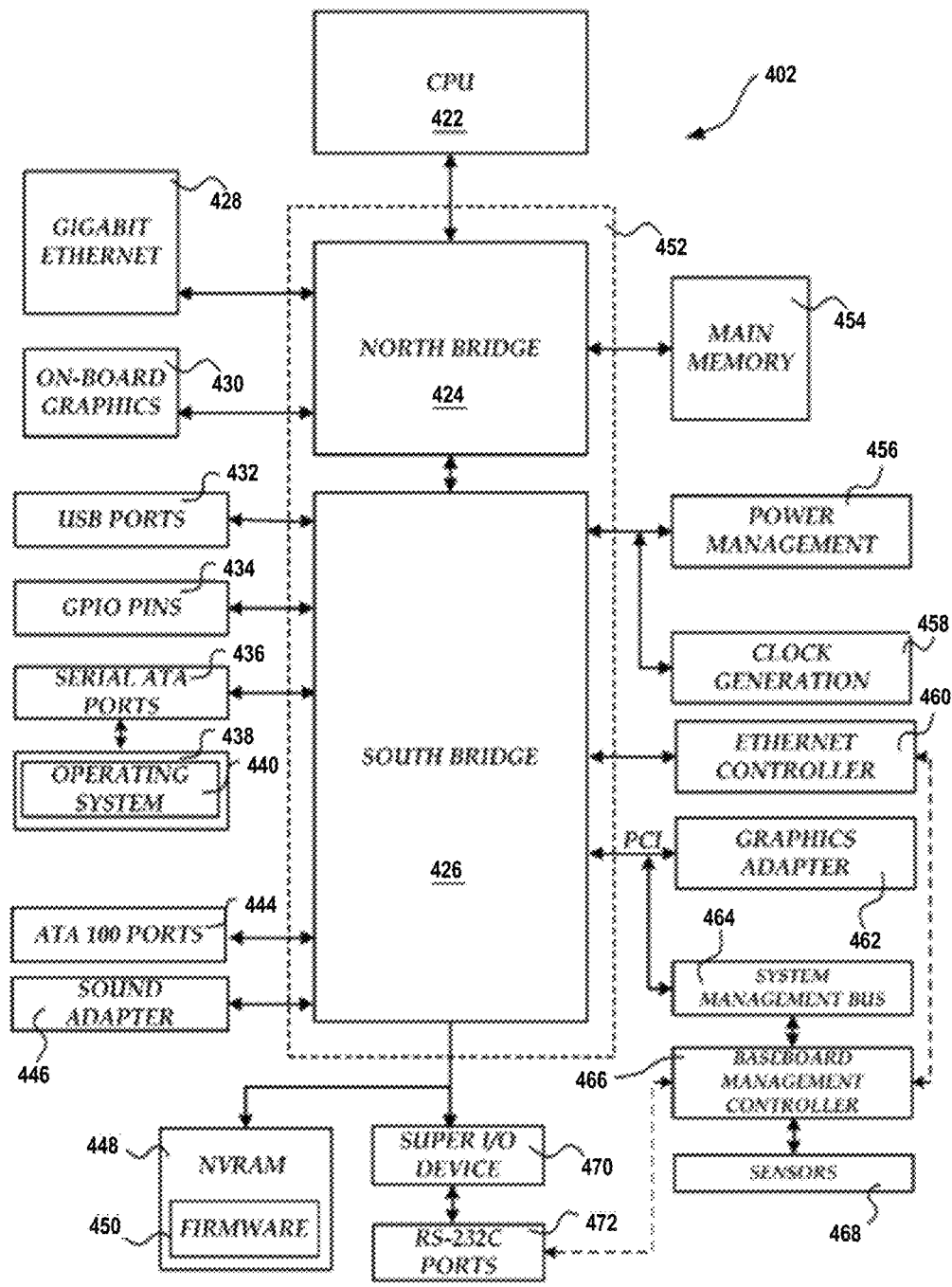
FIG. 4 shows a computer architecture for a computer.

FIG. 4 and the following discussion are intended to provide a brief, general description of one suitable computing environment in which aspects of the embodiments described herein may be implemented. In particular, FIG. 4 shows a computer architecture for a computer 402 that may be utilized to embody the host computer 190, as described supra. It should be appreciated that the computer architecture shown in FIG. 4 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 402 shown in FIG. 4 includes a baseboard, or "motherboard," which is a printed circuit board to which a multitude of components or devices may be connected by way of a system bus or other electrical communication path. In one illustrative embodiment, a CPU 422 operates in conjunction with a chipset 452. The CPU 422 is a standard central processor that performs arithmetic and logical operations necessary for the operation of the computer. The server computer 402 may include a multitude of CPUs 422.

The chipset 452 includes a north bridge 424 and a south bridge 426. The north bridge 424 provides an interface between the CPU 422 and the remainder of the computer 402. The north bridge 424 also provides an interface to a random access memory ("RAM") used as the main memory 454 in the computer 402 and, possibly, to an on-board graphics adapter 430. The north bridge 424 may also include functionality for providing networking functionality through a gigabit Ethernet adapter 428. The gigabit Ethernet adapter 428 is capable of connecting the computer 402 to another computer via a network. Connections which may be made by the network adapter 428 may include LAN or WAN connections. LAN and WAN networking environments are commonplace in offices, enterprise-wide computer networks, intranets, and the internet. The north bridge 424 is connected to the south bridge 426.

The south bridge 426 is responsible for controlling many of the input/output functions of the computer 402. In particular, the south bridge 426 may provide one or more USB ports 432, a sound adapter 446, an Ethernet controller 460, and one or more GPIO pins 434. The south bridge 426 may also provide a bus for interfacing peripheral card devices such as a graphics adapter 462. In one embodiment, the bus comprises a PCI bus. The south bridge 426 may also provide a system management bus 464 for use in managing the various components of the computer 402. Additional details regarding the operation of the system management bus 464 and its connected components are provided below.

The south bridge 426 is also operative to provide one or more interfaces for connecting mass storage devices to the computer 402. For instance, according to an embodiment, the south bridge 426 includes a serial advanced technology attachment ("SATA") adapter for providing one or more SATA ports 436 and an ATA 100 adapter for providing one or more ATA 100 ports 444. The SATA ports 436 and the ATA 100 ports 444 may be, in turn, connected to one or more mass storage devices such as the SATA disk drive 438 storing an operating system 440 and application programs.

As known to those skilled in the art, an operating system 440 comprises a set of programs that control operations of a computer and allocation of resources. An application program is software that runs on top of the operating system software, or other runtime environment, and uses computer resources to perform application specific tasks desired by the user. According to one embodiment of the invention, the operating system 440 comprises the LINUX operating system. According to another embodiment of the invention the operating system 440 comprises an operating system within the WINDOWS family of operating systems from MICROSOFT CORPORATION. According to another embodiment, the operating system 440 comprises the UNIX, LINUX, or SOLARIS operating system. It should be appreciated that other operating systems may also be utilized.

The mass storage devices connected to the south bridge 426, and their associated computer storage media, provide non-volatile storage for the computer 402. Although the description of computer storage media contained herein refers to a mass storage device, such as a hard disk or CD-ROM drive, it should be appreciated by those skilled in the art that computer storage media can be any available media that can be accessed by the computer 402.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 426 for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that help to start up the computer 402 and to transfer information between elements within the computer 402.

As described briefly above, the south bridge 426 may include a system management bus 464. The system management bus 464 may include a BMC 466. The BMC 466 may be the BMC 102. In general, the BMC 466 is a microcontroller that monitors operation of the computer system 402. In a more specific embodiment, the BMC 466 monitors health-related aspects associated with the computer system 402, such as, but not limited to, the temperature of one or more components of the computer system 402, speed of rotational components (e.g., spindle motor, CPU Fan, etc.) within the system, the voltage across or applied to one or more components within the system 402, and the available or used capacity of memory devices within the system 402. To accomplish these monitoring functions, the BMC 466 is communicatively connected to one or more components by way of the management bus 464. In an embodiment, these components include sensor devices 468 for measuring various operating and performance-related parameters within the computer system 402. The sensor devices 468 may be either hardware or software based components configured or programmed to measure or detect one or more of the various operating and performance-related parameters.

It should also be appreciated that the computer 402 may comprise other types of computing devices, including handheld computers, embedded computer systems, personal digital assistants, and other types of computing devices known to those skilled in the art. It is also contemplated that the computer 402 may not include all of the components shown in FIG. 4, may include other components that are not explicitly shown in FIG. 4, or may utilize an architecture completely different than that shown in FIG. 4.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating an embedded-system device, the embedded-system device being a baseboard management controller (BMC), comprising:
    obtaining, through a first serial port at the BMC and in a predetermined time period, first input from a source and directed to a serial port;
    attempting to detect in the first input a request for accessing the embedded-system device;
    processing second input from the source received through the first serial port when the request is detected in the first input; and
    instructing, by the BMC, a switch that switches the source from being in communication with the first serial port to being in communication with a second serial port at a host of the BMC, when the request is not detected in inputs received through the first serial port in the predetermined time period.

2. The method of claim 1, wherein the switch directs communication with the source to one of the first serial port and the second serial port, wherein the predetermined time period is in a booting process of the BMC, the method further comprising:
    continuing the booting process to boot an operating system of the embedded-system device.

3. The method of claim 1, further comprising initiating the booting process prior to obtaining the first input, wherein the booting process is for booting an operating system of the embedded-system device.

4. The method of claim 1, wherein the obtaining the first input from the source comprises instructing the switch to allow communication between the source and the first serial port, wherein the switch directs communication with the source to one of the first serial port and the second serial port.

5. The method of claim 1, wherein the processing the second input comprises sending the second input to a service component of the embedded-system device, wherein the second input contains command or data that are recognizable by the service component.

6. The method of claim 1, wherein the predetermined time period is in a booting process of the BMC, the method further comprising:
    subsequent to the processing the second input, receiving an indication through the first serial port to arrange input from the source to be received at the second serial port; and
    continuing the booting process to boot an operating system of the embedded-system device.

7. An apparatus, the apparatus being an embedded-system device, the embedded-system device being a baseboard management controller (BMC), comprising:
    a memory; and
    at least one processor coupled to the memory and configured to:
        obtain, through a first serial port at the BMC and in a predetermined time period, first input from a source and directed to a serial port;
        attempt to detect in the first input a request for accessing the embedded-system device;
        process second input from the source received through the first serial port when the request is detected in the first input; and
        instruct a switch that switches the source from being in communication with the first serial port to being in communication with a second serial port at a host of the BMC, when the request is not detected in inputs received through the first serial port in the predetermined time period.

8. The apparatus of claim 7, wherein the switch directs communication with the source to one of the first serial port and the second serial port, wherein the predetermined time period is in a booting process of the BMC,
    wherein the at least one processor is further configured to continue the booting process to boot an operating system of the embedded-system device.

9. The apparatus of claim 7, wherein the at least one processor is further configured to initiate the booting process prior to obtaining the first input, wherein the booting process is for booting an operating system of the embedded-system device.

10. The apparatus of claim 7, wherein to obtain the first input from the source, the at least one processor is further configured to instruct the switch to allow communication between the source and the first serial port, wherein the switch directs communication with the source to one of the first serial port and the second serial port.

11. The apparatus of claim 7, wherein to process the second input, the at least one processor is further configured to send the second input to a service component of the embedded-system device, wherein the second input contains command or data that are recognizable by the service component.

12. The apparatus of claim 7, wherein the predetermined time period is in a booting process of the BMC, wherein the at least one processor is further configured to:
- subsequent to the processing the second input, receive an indication through the first serial port to arrange input from the source to be received at the second serial port; and
- continue the booting process to boot an operating system of the embedded-system device.

13. A non-transitory computer-readable medium storing computer executable code for operating an embedded-system device, the embedded-system device being a baseboard management controller (BMC), comprising code to:
- obtain, through a first serial port at the BMC and in a predetermined time period, first input from a source and directed to a serial port;
- attempt to detect in the first input a request for accessing the embedded-system device;
- process second input from the source received through the first serial port when the request is detected in the first input; and
- instruct a switch that switches the source from being in communication with the first serial port to being in communication with a second serial port at a host of the BMC, when the request is not detected in inputs received through the first serial port in the predetermined time period.

14. The non-transitory computer-readable medium of claim 13, wherein the switch directs communication with the source to one of the first serial port and the second serial port, wherein the predetermined time period is in a booting process of the BMC,
- wherein the code is further configured to continue the booting process to boot an operating system of the embedded-system device.

15. The non-transitory computer-readable medium of claim 13, wherein the code is further configured to initiate the booting process prior to obtaining the first input, wherein the booting process is for booting an operating system of the embedded-system device.

16. The non-transitory computer-readable medium of claim 13, wherein to obtain the first input from the source, the code is further configured to instruct the switch to allow communication between the source and the first serial port, wherein the switch directs communication with the source to one of the first serial port and the second serial port.

17. The non-transitory computer-readable medium of claim 13, wherein to process the second input, the code is further configured to send the second input to a service component of the embedded-system device, wherein the second input contains command or data that are recognizable by the service component, wherein the predetermined time period is in a booting process of the BMC, wherein the code is further configured to:
- subsequent to the processing the second input, receive an indication through the first serial port to arrange input from the source to be received at the second serial port; and
- continue the booting process to boot an operating system of the embedded-system device.

* * * * *